US007013287B1

(12) United States Patent
Doelle et al.

(10) Patent No.: US 7,013,287 B1
(45) Date of Patent: Mar. 14, 2006

(54) STOCK PREPARATION MONITORING SYSTEM AND METHOD OF SAME

(75) Inventors: Klaus Doelle, Menasha, WI (US); Robert J. Matz, Appleton, WI (US)

(73) Assignee: Voith Sulzer Paper Technology N. America, Inc., Appleton, WI (US)

(*) Notice: Subject to any disclaimer, the term of this patent is extended or adjusted under 35 U.S.C. 154(b) by 0 days.

(21) Appl. No.: 09/510,651

(22) Filed: Feb. 22, 2000

(51) Int. Cl.
*G06F 17/60* (2006.01)
*G06F 19/00* (2006.01)
*D21F 1/00* (2006.01)

(52) U.S. Cl. .................. 705/26; 162/272; 162/199; 700/175; 700/177; 702/34; 702/188

(58) Field of Classification Search ............... 162/261, 162/52, 246, 263, 272, 273, 274, 381, 199; 702/33–35, 188; 705/26–27; 700/175, 177
See application file for complete search history.

(56) References Cited

U.S. PATENT DOCUMENTS

| 4,559,828 A | * | 12/1985 | Liszka ........................ 73/658 |
| 5,810,973 A | * | 9/1998 | Carlsmith .................. 162/261 |
| 5,845,230 A | * | 12/1998 | Lamberson ................. 702/56 |
| 5,944,952 A | * | 8/1999 | Shackford ................... 162/52 |
| 6,267,847 B1 | * | 7/2001 | Doelle ........................ 162/246 |
| 6,298,308 B1 | * | 10/2001 | Reid et al. .................. 702/56 |
| 6,505,145 B1 | * | 1/2003 | Bjornson .................... 702/185 |

FOREIGN PATENT DOCUMENTS

GB 2306225 A * 4/1997

OTHER PUBLICATIONS

Galasso: "Business goals, end-users must drive information systems selection", Pulp & Paper, Nov. 1998, vol. 72, Iss. 11, p. 50.*

* cited by examiner

*Primary Examiner*—Jeffrey A. Smith
(74) *Attorney, Agent, or Firm*—Taylor & Aust, P.C.

(57) ABSTRACT

A stock preparation system includes a stock preparation apparatus and a sensor coupled with the stock preparation apparatus. The sensor is configured for sensing a physical parameter associated with the stock preparation apparatus, and includes a wireless transmitter for transmitting an airborne wireless output signal corresponding to the sensed physical parameter. A remote unit includes a receiver for receiving the wireless output signal and a first data link for transmitting a remote output signal corresponding to the wireless output signal. A base unit includes a second data link at least intermittently coupled with the first data link for receiving the remote output signal. The base unit is configured for at least one of: analyzing the remote output signal; transmitting a state notification to the remote unit via the second data link and the first data link corresponding to a state of the sensed physical parameter; transmitting a price quote to the remote unit via the second data link and the first data link; and transmitting a shipment notification to the remote unit via the second data link and the first data link indicating a part has been shipped.

17 Claims, 2 Drawing Sheets

STOCK PREPARATION MONITORING SYSTEM AND METHOD OF SAME

BACKGROUND OF THE INVENTION

1. Field of the Invention

The present invention relates to a stock preparation system, and, more particularly, to a system for monitoring a stock preparation apparatus in such a system.

2. Description of the Related Art

A fiber stock preparation system is used to make a fiber suspension from a source of fiber such as wood. The fiber stock preparation system receives the raw source of fiber, breaks the raw source of fiber into individual fibers suspended within a liquid such as water, and separates contaminants from the fiber suspension. A fiber stock preparation system typically includes a plurality of moving parts, such as augers, screens, foils, rolls, etc. which separate and clean the fiber in the fiber suspension. Because of the inherent abrasive nature of the fibers, these various moving parts within the stock preparation system become worn over time and must be replaced on a periodic basis.

With a conventional stock preparation system as described above, a user typically obtains a sample of the fiber suspension at a selected point within the stock preparation system. Physical parameters associated with the fiber suspension may be utilized to determine whether a part within the fiber stock preparation system has become worn to an undesirable amount. The process of obtaining a sample of the fiber suspension and then testing the fiber suspension to determine a wear state of a part within the fiber stock preparation system is time consuming and prone to inaccuracies. Additionally, if a part is found to be worn beyond an acceptable level, an appreciable time delay may occur during ordering, shipment and arrival of a replacement part.

What is needed in the art is a system for monitoring the wear state of a wear part within a stock preparation system on an automated basis. What is further needed in the art is a monitoring system which provides early detection of a wear state of a wear part and shipment of a replacement part before the wear part is essentially unuseable. A further need in the art is a monitoring system which may be retrofitted on already existing equipment without the need for complicated hard wiring, etc. of electrical components.

SUMMARY OF THE INVENTION

The present invention provides a system and method for directly monitoring the state of a wear part in a stock preparation apparatus. A sensor output signal is used to analyze the state of the wear part and a state notification, price quote and/or shipment notification is sent to the user at the remote location.

The invention comprises, in one form thereof, a stock preparation system including a stock preparation apparatus and a sensor coupled with the stock preparation apparatus. The sensor is configured for sensing a physical parameter associated with the stock preparation apparatus, and includes a wireless transmitter for transmitting an air-borne wireless output signal corresponding to the sensed physical parameter. A remote unit includes a receiver for receiving the wireless output signal and a first data link for transmitting a remote output signal corresponding to the wireless output signal. A base unit includes a second data link at least intermittently coupled with the first data link for receiving the remote output signal. The base unit is configured for at least one of: analyzing the remote output signal; transmitting a state notification to the remote unit via the second data link and the first data link corresponding to a state of the sensed physical parameter; transmitting a price quote to the remote unit via the second data link and the first data link; and transmitting a shipment notification to the remote unit via the second data link and the first data link indicating a part has been shipped.

An advantage of the present invention is that the state of the wear part is directly determined through the sensor output signals, rather than indirectly inferred through physical properties of the stock.

Yet another advantage is that the data analysis occurs at a base unit remote from the stock preparation apparatus, thus allowing remote monitoring of the system.

A further advantage is that the sensors are configured as wireless sensors and thus can be easily retrofitted onto existing machinery without unsightly and cumbersome electrical cables, etc.

A still further advantage is that the data acquisition and analysis occurs seemlessly to and without effort by the customer at the remote location, thus providing improved service to the customer while ensuring prompt sales through replacement parts to the manufacturer.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
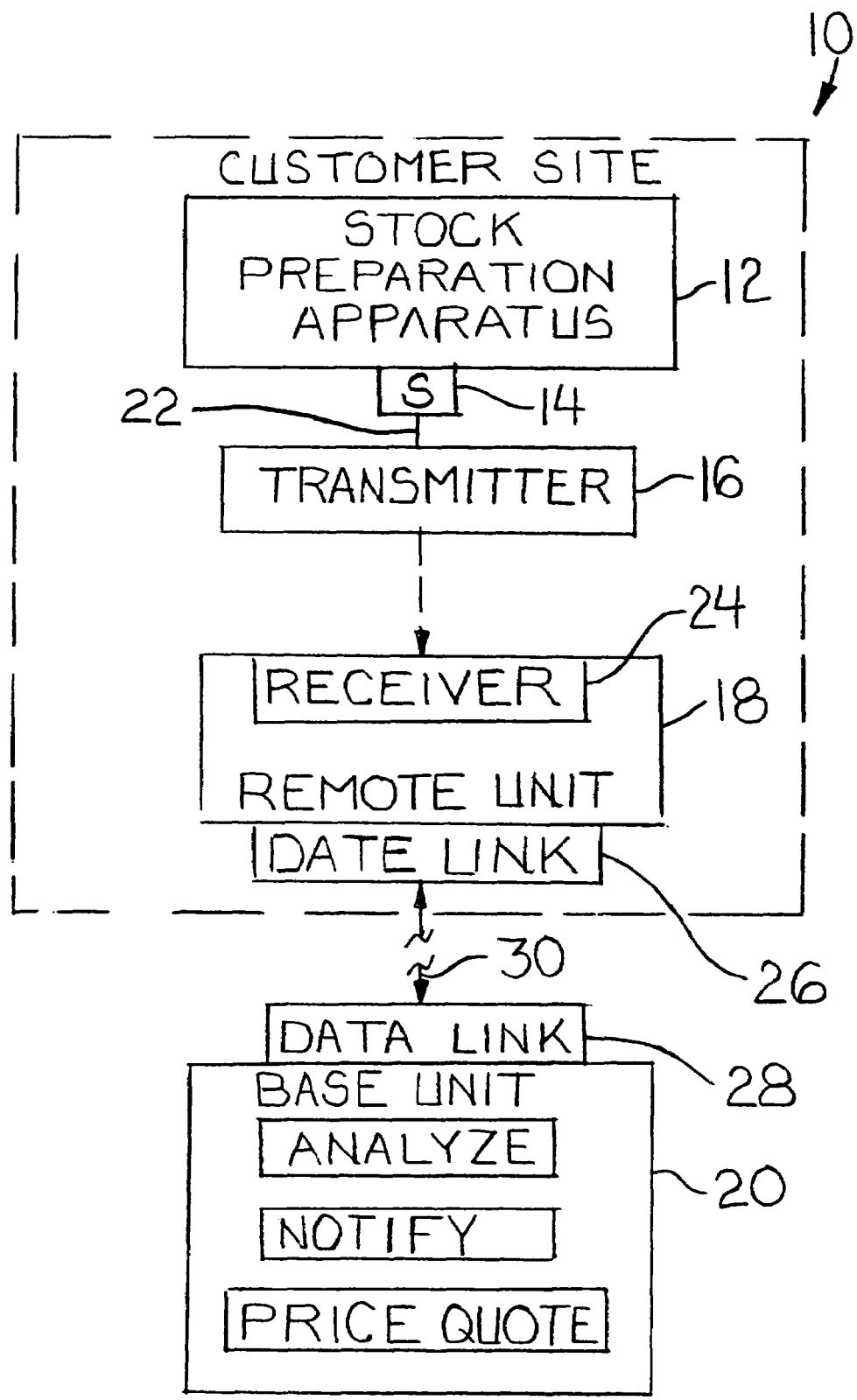
FIG. 1 is a schematic view of a stock preparation monitoring system of the present invention.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Referring now to the drawings and more particularly to FIG. 1, there is shown an embodiment of a stock preparation monitoring system 10 for monitoring a physical parameter at a remote location or customer site. Stock preparation monitoring system 10 generally includes a stock preparation apparatus 12, sensor 14, transmitter 16 and remote unit 18 which are located at the remote customer site; and a base unit 20 which is located at a distant manufacturing or analysis site.

Stock preparation apparatus 12 is used to prepare a fiber suspension from a source of fiber such as wood, etc. In the embodiment shown, stock preparation apparatus is a screen basket with a wear part 13 in the form of a screen therein. The screen within the screen basket includes a plurality of holes of conventional design. Accordingly, screen 13 is not shown in detail in FIG. 1.

Sensor 14 is coupled with stock preparation apparatus 12 and is configured for sensing a physical parameter associated with stock preparation apparatus 12. In the embodiment shown, sensor 14 is an ultrasound transceiver which transmits ultrasound waves against screen 13 within stock preparation apparatus 12 and receives the reflected ultrasound waves to determine a physical parameter associated with stock preparation apparatus 12. For example, the size of the holes and/or a change in the size of the holes within stock preparation apparatus 12 may be determined using ultrasound transceiver 14.

Sensor 14 includes a transmitter 16 which transmits an air-borne wireless output signal corresponding to the physical parameter sensed by sensor 14. Transmitter 16 may be integral with sensor 14, or may be mechanically and/or electrically coupled with sensor 14, as indicated by line 22.

Although sensor 14 is shown as an ultrasound transceiver in the embodiment of FIG. 1, other types of sensors are also possible. For example, stock preparation apparatus 12 may include a wear part in the form of a rotatable element such as an auger, roll, etc. carried by a plurality of reduced friction bearings. Sensor 14 may thus be configured to sense the amplitude and/or frequency of vibrations associated with a bearing carrying the rotatable element. Other types of sensors are also possible, depending upon the specific physical parameter associated with an element within stock preparation apparatus 12 which is to be sensed.

Remote unit 18 is located at the customer site and receives one or more air-borne wireless output signals at a receiver 24 which are transmitted from transmitter 16. In the embodiment shown, transmitter 16 transmits a radio frequency (RF) signal which is received at receiver 24. The RF signal may be utilized as a carrier for carrying digital data signals thereon. Receiver 24 includes appropriate circuitry which is configured for separating the data from the carrier signal. The data signals may include, e.g., an identification code to identify a particular sensor 14 or transmitter 16 from which the wireless output signal is transmitted. Other types of wireless links such as an infrared (IR) link may also be used.

By providing a wireless link between transmitter 16 and remote unit 18, it is unnecessary to hardwire remote unit 18 with stock preparation apparatus 12. Thus, sensor 14 and transmitter 16 may be installed on an already existing stock preparation apparatus 12 (i.e., for retrofit applications).

Remote unit 18 includes a data link 26 for transmitting a remote output signal corresponding to the wireless output signal received from transmitter 16. In the embodiment shown, data link 26 is in the form of a modem which is configured to transmit digital data via a telephone line connection. Other types of data links, such as a fiber optic connection, etc., are also possible.

Base unit 20 is disposed at a location remote from stock preparation apparatus 12. Base unit 20 includes a data link 28 which is coupled with data link 26 via communication line 30. In the embodiment shown, data link 28 is in the form of a modem which may be coupled either directly with modem 26 or indirectly through an internet connection.

Base unit 20 includes appropriate electrical circuitry such as a microprocessor, memory, etc. to analyze the remote output signal received at modem 28 and provide feedback to the customer at the customer site where stock preparation apparatus 12 is located. Base unit 20 utilizes one or more remote output signals received at modem 28 to analyze the present state of a wear part within stock preparation apparatus 12 at the customer site. If sensor 14 is configured as an ultrasound transceiver as described above, an average value of a plurality of remote output signals received at modem 28 is calculated which corresponds to an average hole size of a plurality of holes in a screen within stock preparation apparatus 12. Since the average size of the holes tends to increase as the screen wears, the average value of the remote output signals received at modem 28 in turn corresponds to a wear state of the screen within stock preparation apparatus 12. If the wear state of a wear part exceeds a threshold value (i.e., which may be stored within a look-up table), base unit 20 transmits a feedback signal from modem 28 to modem 26 via communication line 30. The feedback signal may simply correspond to a wear state of a wear part within stock preparation apparatus 12. Alternatively, the feedback signal may be in the form of a wear state notification along with a price quote to the customer for a replacement part. Additionally, if the customer has previously authorized shipment of a replacement part upon detection of a worn part, the feedback signal may correspond to a notification to the customer that a worn part has been detected and a replacement part has already been shipped.

During use, sensor 14 and transmitter 16 are coupled or positioned in association with a wear part such as a screen within stock preparation apparatus 12. Since transmitter 16 is configured as a wireless transmitter, sensor 14 and transmitter 16 may be easily installed on already existing equipment without hardwiring, etc. Transmitter 16 transmits one or more air-borne wireless output signals to receiver 24 within remote unit 18 at the customer site. Remote unit 18 is either continuously or intermittently connected with base unit 20 at a distant location via communication line 30 using modems 26 and 28. Remote unit 18 may either simply pass the data corresponding to the wireless output signal directly through to base unit 20, or may reformat the data to a type which is more readily useable by base unit 20. Base unit 20 analyzes one or more data signals received from remote unit 18 and establishes a wear state of a wear part within stock preparation apparatus 12. Depending upon the result of the analysis carried out by base unit 20, base unit 20 provides either no feedback to remote unit 18 or provides one or more feedback signals to remote unit 18. The feedback signals may represent, e.g., a wear state of the wear part within stock preparation apparatus 12, a price quote or a shipment notification.

Figure 2:
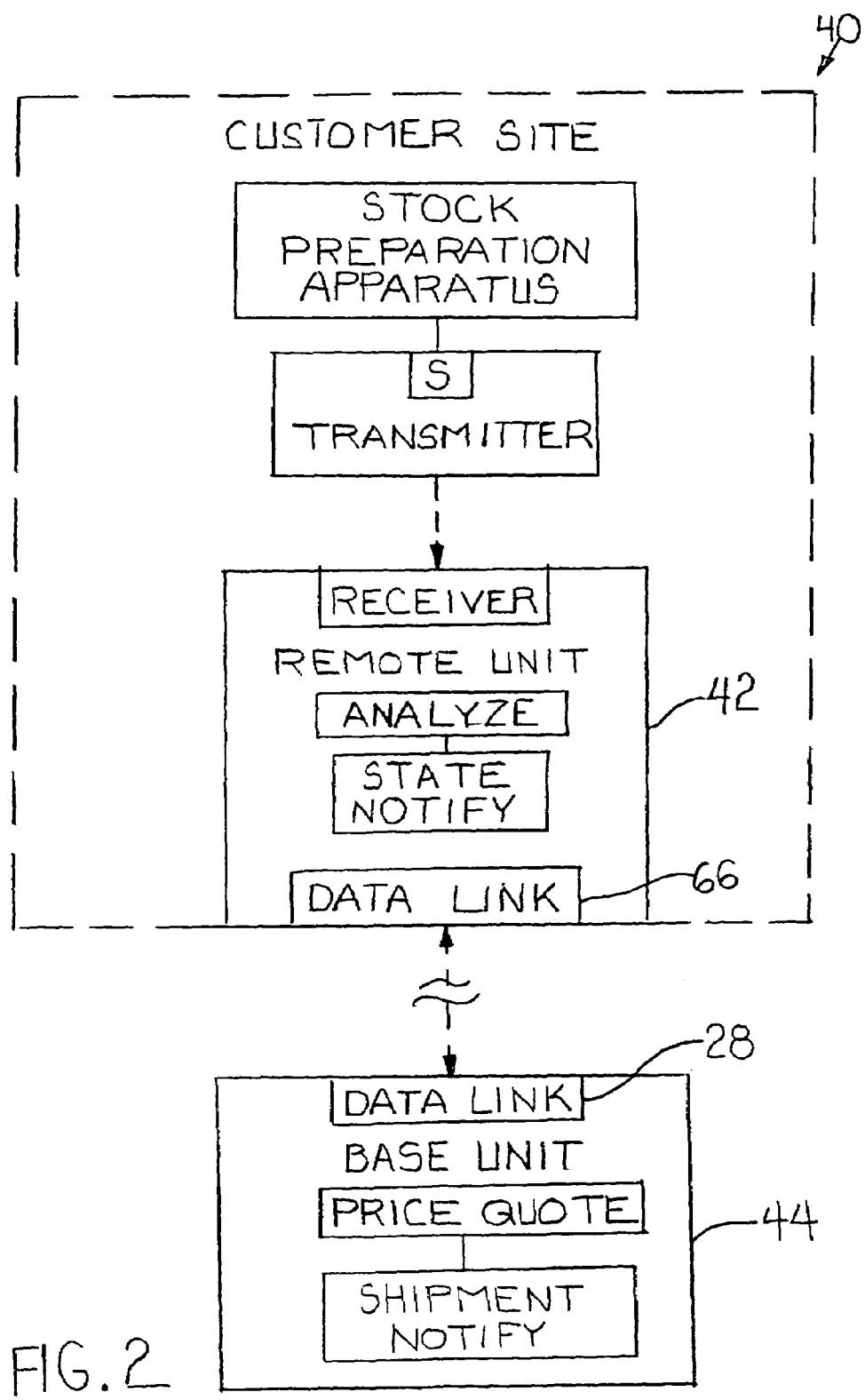
FIG. 2 is a schematic view of another embodiment of a stock preparation monitoring system of the present invention.

Referring now to FIG. 2, another embodiment of a stock preparation monitoring system 40 the present invention is shown. Stock preparation monitoring system 40 is similar in many respects to stock preparation monitoring system 10 shown in FIG. 1. One difference is that data links 26 and 28 are configured as internal modems which are integral with remote unit 42 and base unit 44, respectively. One other difference is that at least some of the functionality previously associated with base unit 20 shown in FIG. 1 is instead carried out within remote unit 42 shown in FIG. 2. More particularly, rather than transmitting a remote output signal from remote unit 42 to base unit 44 for remote analysis at base unit 44, data analysis occurs within remote unit 42 located at the customer site. If the data analysis results in a determination of a worn state of a wear part, it is only necessary to transmit the remote output signal to base unit 44 indicating the occurrence of such an event. Thus, the amount of data which is transmitted from remote unit 42 to base unit 44 is reduced. It is thus apparent that although the overall functionality of stock preparation monitoring system is substantially the same as stock preparation monitoring system 10 shown in FIG. 1, the associated control logic may be carried out by electrical components located at different locations within stock preparation monitoring system 40.

In the embodiments of the present invention described above and shown in FIGS. 1 and 2, the remote monitoring of a wear state of a wear part is carried out within a system for making a fiber suspension, i.e., a fiber stock preparation system. However, it is to be understood that the principles of the present invention may also be carried out using a system which processes a fiber suspension, i.e., a paper-making machine.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A stock preparation monitoring system, comprising:
   a stock preparation apparatus;
   a sensor coupled with said stock preparation apparatus and configured for sensing a physical parameter associated with said stock preparation apparatus, said sensor including a wireless transmitter for transmitting an air-borne wireless output signal corresponding to said sensed physical parameter;
   a remote unit including a receiver for receiving said wireless output signal, said receiver including a first data link for transmitting a remote output signal corresponding to said wireless output signal; and
   a base unit including a second data link at least intermittently coupled with said first data link for receiving said remote output signal, said base unit including means for at least one of:
   transmitting a price quote to said remote unit via said second data link and said first data link; and
   transmitting a shipment notification to said remote unit via said second data link and said first data link indicating a part has been shipped.

2. The stock preparation system of claim 1, wherein said stock preparation apparatus includes a wear part, and wherein said wireless output signal corresponds to a wear state of said wear part.

3. The stock preparation system of claim 1, said remote unit including means for at least one of:
   analyzing said wireless output signal; and
   transmitting a state notification to said base unit via said first data link and said second data link corresponding to a state of said sensed physical parameter.

4. The stock preparation system of claim 1, wherein said first data link and said second data link each comprise a modem.

5. A stock preparation monitoring system, comprising:
   a stock preparation apparatus;
   a sensor coupled with said stock preparation apparatus and configured for sensing a physical parameter associated with said stock preparation apparatus, said sensor including a wireless transmitter for transmitting an air-borne wireless output signal corresponding to said sensed physical parameter;
   a remote unit including a receiver for receiving said wireless output signal, said receiver including a first data link for transmitting a remote output signal corresponding to said wireless output signal; and
   a base unit including a second data link at least intermittently coupled with said first data link for receiving said remote output signal, said base unit including means for at least one of:
   analyzing said remote output signal;
   transmitting a state notification to said remote unit via said second data link and said first data link corresponding to a state of said sensed physical parameter;
   transmitting a price quote to said remote unit via said second data link and said first data link; and
   transmitting a shipment notification to said remote unit via said second data link and said first data link indicating a part has been shipped;
   wherein said stock preparation apparatus includes a wear part and said wireless output signal corresponds to a wear state of said wear part; and
   wherein said stock preparation apparatus comprises a screen basket and said wear part comprises a screen within said screen basket.

6. The stock preparation system of claim 5, wherein said screen includes a plurality of holes and said wireless output signal generally corresponds to a profile of said holes.

7. The stock preparation system of claim 6, wherein said sensor comprises an ultrasound transceiver.

8. The stock preparation system of claim 7, wherein said wireless output signal generally corresponds to a size of said holes.

9. A stock preparation monitoring system, comprising:
   a stock preparation apparatus;
   a sensor coupled with said stock preparation apparatus and configured for sensing a physical parameter associated with said stock preparation apparatus, said sensor including a wireless transmitter for transmitting an air-borne wireless output signal corresponding to said sensed physical parameter;
   a remote unit including a receiver for receiving said wireless output signal, said receiver including a first data link for transmitting a remote output signal corresponding to said wireless output signal; and
   a base unit including a second data link at least intermittently coupled with said first data link for receiving said remote output signal, said base unit including means for at least one of:
   analyzing said remote output signal;
   transmitting a state notification to said remote unit via said second data link and said first data link corresponding to a state of said sensed physical parameter;
   transmitting a price quote to said remote unit via said second data link and said first data link; and
   transmitting a shipment notification to said remote unit via said second data link and said first data link indicating a part has been shipped;
   wherein said base unit includes means for each of said analyzing step and said transmitting steps.

10. A method of monitoring a stock preparation system, comprising the steps of:
    providing a stock preparation apparatus;
    coupling a sensor with said stock preparation apparatus;
    sensing a physical parameter associated with said stock preparation apparatus;
    transmitting an air-borne wireless output signal using a wireless transmitter, said wireless output signal corresponding to said sensed physical parameter;
    receiving said wireless output signal at a receiver of a remote unit;
    transmitting a remote output signal from a first data link of said remote unit to a second data link of a base unit; and
    at least one of:

transmitting a price quote to said remote unit via said second data link and said first data link; and transmitting a shipment notification to said remote unit via said second data link and said first data link indicating a part has been shipped.

11. The method of claim 10, including analyzing said remote output signal in said base unit.

12. The method of claim 10, including analyzing said remote output signal in said remote unit.

13. The method of claim 10, including analyzing said remote output signal and transmitting a state notification to said remote unit from said base unit.

14. The method of claim 10, wherein said steps of transmitting said price quote and transmitting said shipment notification are each carried out in said base unit.

15. The method of claim 10, wherein said first data link and said second data link each comprise a modem and said step of transmitting said remote output signal is carried out intermittently.

16. The method of claim 10, wherein said analyzing step is carried out after said step of transmitting said remote output signal.

17. A stock preparation monitoring system, comprising:

a stock preparation apparatus;

a sensor coupled with said stock preparation apparatus and configured for sensing a physical parameter associated with said stock preparation apparatus, said sensor including a transmitter for transmitting an output signal corresponding to said sensed physical parameter;

a remote unit including a receiver for receiving said output signal, said receiver including a first data link for transmitting a remote output signal corresponding to said output signal; and a base unit including a second data link at least intermittently coupled with said first data link for receiving said remote output signal, said base unit including means for at least one of:

transmitting a price quote to said remote unit via said second data link and said first data link; and transmitting a shipment notification to said remote unit via said second data link and said first data link indicating a part has been shipped.

* * * * *